J. C. WILSON.
METHOD OF AND APPARATUS FOR CONTROLLING THE FLOW OF FLUIDS.
APPLICATION FILED SEPT. 13, 1920.
1,437,627.                                          Patented Dec. 5, 1922.
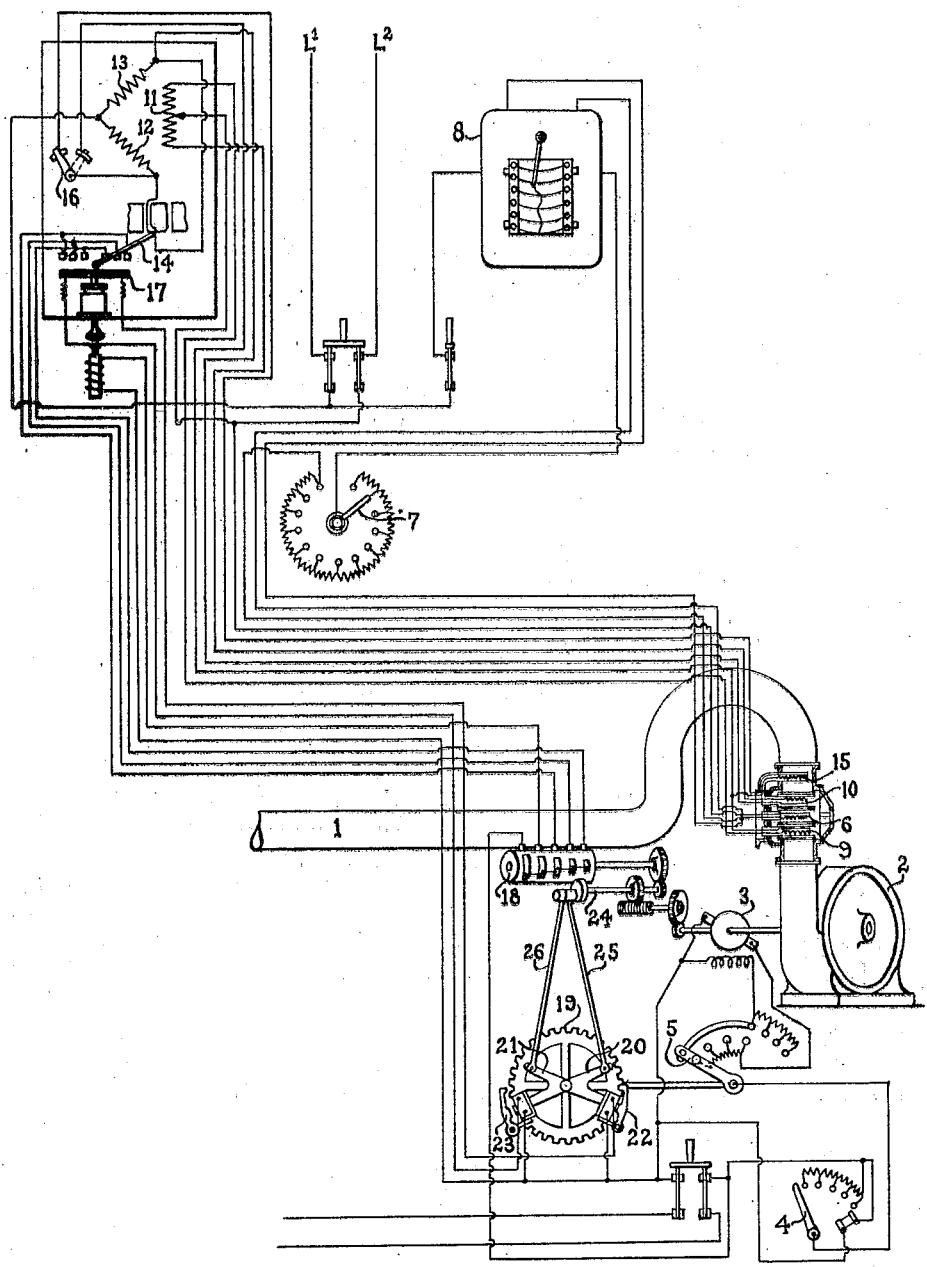
Inventor
John C. Wilson.
By
Attorney Patented Dec. 5, 1922.

1,437,627

UNITED STATES PATENT OFFICE.

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

METHOD OF AND APPARATUS FOR CONTROLLING THE FLOW OF FLUIDS.

Application filed September 13, 1920. Serial No. 410,088.

*To all whom it may concern:*

Be it known that I, JOHN C. WILSON, a citizen of the United States, residing at Milwaukee, in the county of Milwaukee and State of Wisconsin, have invented new and useful Improvements in Methods of and Apparatus for Controlling the Flow of Fluids, of which the following is a full, clear, concise, and exact description, reference being had to the accompanying drawing, forming a part of this specification.

This invention relates to a method of and apparatus for controlling the flow of fluids.

In practice it is frequently desired, as in combustion and chemical processes, to control accurately the quantity of a fluid supplied per unit time and the present invention has among its objects that of providing an improved method and improved and simplified means for accomplishing such result.

Various additional objects and advantages will hereinafter appear.

The present application is in the nature of a division or continuation in part of my copending application, Serial No. 198,554, filed Oct. 25, 1917, wherein are disclosed but not claimed a method of and means for controlling a flow of fluid through speed regulation of a blower or other instrumentality employed for supplying kinetic energy to the fluid, such regulation being controlled in accordance with effects produced by a heat exchange involving such flow and a body or medium between which and such flow is maintained a temperature difference.

More particularly the present invention, following the disclosure of said copending application, contemplates the use of a galvanometer needle, or the like subjected to influence in accordance with the effect of the aforementioned heat exchange, whereby upon variation from a given or standard value of the rate of the flow to be controlled said needle or the like is deflected in one direction or the other from an intermediate neutral position, while a motor-driven control mechanism is periodically subjected to control in accordance with the direction and amount of deflection of such galvanometer needle for effecting suitable speed regulation of the prime mover employed to drive the aforementioned blower or the like.

Also according to the present invention it is proposed to utilize power derived from such prime mover for actuation of such control mechanism therefor, thereby rendering the frequency of such periodic control of the latter proportional to the speed of such blower or the like.

The accompanying drawing illustrates diagrammatically and schematically one form of apparatus adapted to carrying out the instant method.

In the drawing, a conduit 1 is arranged to be supplied with air or other fluid by a centrifugal blower 2, the latter to be driven by a variable speed prime mover, in the present instance an electric motor 3 having a hand starter 4 and being subjected to further speed control by means of a combined armature and field regulating rheostat 5. Said rheostat is in turn subjected to actuation and control in accordance with the rate of flow of fluid in the conduit 1.

The means employed for effecting said last-mentioned control possess numerous features in common with the well-known Thomas fluid meter particularly as the same is disclosed and claimed in Patent No. 1,222,492 of Apr. 10, 1917, to Carl C. Thomas and in Patent No. 1,261,086 of Apr. 2, 1918, to John C. Wilson and Horace N. Packard. Certain of such features are moreover disclosed but not claimed in my aforesaid copending application of which the instant application is a division or continuation in part. The instant control means, however, differs from the disclosure of the afore-mentioned patents particularly in that the former is utilized for regulation of the flow of fluid without necessarily measuring the same in the ordinary sense whereas said patents relate fundamentally to measuring devices.

Among the more important characteristics of the Thomas meter as disclosed in the foregoing citations is that of effecting accurate measurement of a flow of fluid such measurement being independent of variations in pressure or temperature of the fluid and also substantially independent of variations in the saturation condition of the fluid, particularly as such condition is influenced by temperature. The control means herein employed is, moreover, adapted inherently to act in accordance with the same laws and in a similar manner to compensate for the aforementioned variable factors whereby the rheostat 5, being subjected to such control, is adapted through speed regulation of the driving motor to effect a positive control of the rate of flow of the fluid induced by the blower 2. The theory of the Thomas meter being well-known, the analogous features of the instant control will not be minutely set forth herein.

Briefly stated, such control means comprises an electrical heating element 6 arranged within the conduit 1 in heat exchanging relation with the fluid flowing in the latter, said element to be supplied with electrical energy from line $L'$ $L^2$, the value of the energy so supplied being regulable by means of a rheostat 7. If desired, an indicating device shown at 8 may be employed for ascertaining, and optionally for recording, the value of the electrical energy so supplied, or said device 8 may be adapted to indicate in terms of fluid flow rather than in electrical units if desired. It is, however, to be understood that the actual regulation effected is not dependent upon such indicating means except as the latter furnished a convenient guide for facilitating adjustment of the rheostat 7 to determine the proper rate of flow.

Resistance thermometers 9 and 10 are also arranged in said conduit and subjected respectively to influence of the temperatures of the fluid before and after passing said heating element. Said resistance thermometers are connected in circuit respectively in two adjacent arms or branches of a Wheatstone bridge, a resistance 11 being further connected in said branches jointly and being adjustable to vary inversely the value of resistance in circuit with the individual resistance thermometers. The other two branches of the Wheatstone bridge comprise fixed resistances 12 and 13. The junctions of said resistance sections 12 and 13 and of the variable sections of the resistance 11 are connected respectively with opposite sides of supply line $L'$ $L^2$, while a galvanometer device including a needle 14 is connected across the intermediate points of the bridge. A temperature difference coil 15 is also arranged within the conduit 1 for connection in series with the resistance thermometer 10 in the usual manner, a switch 16 providing for completion of the circuit of said resistance thermometer either inclusive or exclusive of said coil.

A solenoid operated contacting mechanism 17 of known construction serves to provide for energization of and selection between a plurality of control circuits, such selection being effected in accordance with the degree and direction of deflection of the galvanometer needle 14. A drum contactor 18 is arranged to be driven by the motor 3 at a reduced speed at all times proportional to the speed of the latter, said drum contactor in turn providing for periodic energization of the actuating solenoid of the contacting device 17 and further providing for interruption of any circuit connections established by said latter device following graduated intervals of time dependent upon the set of connections selected by said latter-mentioned contacting device.

The rheostat 5 is directly controlled by a ratcheting device including a toothed wheel 19 and escapement levers 20 and 21 respectively provided with electro-magnetically engageable pawls 22 and 23. A crank shaft 24 is also arranged to be driven at a reduced speed by the motor 3 continuously during operation of the latter, while a pair of links 25 and 26 serve to connect said crank shaft with the respective escapement levers 20 and 21 whereby selective engagement of the pawls 22 and 23 serves to establish a positive step by step drive for the rheostat arm in one direction or the other depending upon which of said pawls is engaged.

Selective energization of the actuating windings of said pawls is controllable jointly by the two contacting devices 17 and 18. The circuit connections controllable by the aforesaid contacting devices are so correlated as to render selective engagement of the respective pawls and consequent selection of the direction of adjustment of the rheostat 5, dependent upon the direction in which the galvanometer needle 14 is deflected from the neutral position illustrated, whereas the degree of such rheostat adjustment is likewise determinable by the amount of deflection of said needle, such features being apparent upon consideration of the diagram.

The manner of operation of the aforedescribed apparatus may be stated as follows. The motor 3 is first started and brought to speed by means of the hand starter 4; thereafter the Wheatstone bridge is balanced in the usual manner and electrical energy is admitted to the heating element 6, the rheostat 7 being thereafter adjusted to a position corresponding with the rate of flow which it is desired to maintain.

If under these or subsequent conditions the actual rate of flow of the fluid differs from such desired rate, the galvanometer needle becomes deflected from its neutral position, in a direction and to an extent dependent upon the character and value of such variation from the desired flow. Thereupon following the next periodic actuation of the solenoid operated contacting device, the ratcheting mechanism is rendered active to vary the adjustment of the rheostat 5 in in a direction and to a degree determined by the direction and amount of deflection of said galvanometer needle, to thereby effect a suitable change in the speed of the driving motor 3 and hence in the speed of the blower rotor whereby the flow of the fluid is adjusted or restored to the normal predetermined rate.

The foregoing construction and arrangement, while involving a minimum number of working parts, possesses the further advantage of inherently minimizing tendencies toward over-regulation and hunting effects.

Since an appreciable time element is necessarily involved before variation in rate of flow is able to influence the regulating device and before the consequent regulation is able to react for adjustment of the flow, it is apparent that for perfect regulation the frequency of the successive actuations of the solenoid operated contacting device should bear a definite relation to the duration of such time element. Thus should such frequency become relatively too high the device might tend to respond twice to a given degree of deflection of the galvanometer needle, whereby obviously twice the desired regulative effect would be obtained with consequent serious hunting effects. On the other hand should such frequency of actuation of the solenoid be relatively too low the regulation would become inherently sluggish.

Moreover, since the value of the aforedescribed time element is obviously influenced by the rate of flow of the fluid as determined by the speed of the blower rotor, it is apparent that the aforedescribed construction, wherein the frequency of energization of the solenoid is proportional to the speed of the blower tends to maintain the proper timing relation and to eliminate the aforedescribed possible sources of error.

What I claim as new and desire to secure by Letters Patent is:

1. The method of controlling the flow of a fluid, which comprises effecting a heat exchange involving elements one of which comprises such flowing fluid and utilizing the temperature change so effected in certain of said elements for regulation of the value of the kinetic energy supplied to the fluid to effect flow thereof.

2. The method of controlling the flow of a fluid supplied by a blower or the like, which comprises effecting a heat exchange involving elements one of which comprises such flowing fluid and utilizing the temperature change so effected in certain of said elements for regulating the speed of the blower.

3. The method of controlling the flow of a fluid which comprises ascertaining periodically the variation in rate of such flow from a given rate of flow, effecting similarly periodic regulation of such flow in accordance with the variations so ascertained and varying the duration of such periods for different rates of flow of the fluid to thereby minimize hunting effects.

4. The method of controlling the rate of flow of a fluid which comprises ascertaining periodically the variation in rate of such flow from a given rate of flow, subjecting the rate of flow of fluid to similarly periodic regulation in accordance with the variations so ascertained and varying the time interval between successive periodic regulations for different rates of flow of the fluid for minimizing hunting effects.

5. The method of controlling the rate of flow of a fluid which comprises effecting a heat exchange involving elements one of which comprises such flowing fluid, ascertaining the variation between the resulting temperature change of one of said elements and the temperature change of the same element resulting from a similar heat exchange involving such fluid flowing at a given rate, subjecting such flow of fluid to timed regulative action involving a time element which varies for different rates of such flow and varying the frequency of such regulative action for different rates of flow to thereby minimize over-regulation and hunting effects.

6. Apparatus for controlling the flow of a fluid, comprising in combination, means for effecting a flow of the fluid, means for effecting a heat exchange involving elements one of which comprises such flowing fluid and means for utilizing the temperature change so effected in certain of said elements for subjecting said first mentioned means to regulation to thereby regulate the flow of said fluid.

7. Apparatus for controlling the flow of a fluid comprising in combination, a blower for effecting such flow of fluid, variable speed driving means for the blower, means for effecting a heat exchange involving elements one of which comprises such flowing fluid, and means for subjecting said driving means to speed control in accordance with the temperature change effected in certain of said elements as a result of such heat exchange, to thereby regulate the flow of fluid.

8. Apparatus for effecting and controlling a flow of fluid comprising in combination, a blower, a variable speed electric motor for driving said blower, electrothermic means for effecting a heat exchange involving elements one of which comprises the flowing fluid and electrically operated means for subjecting said motor to speed control in accordance with the temperature change effected in certain of said elements as a result of such heat exchange, to thereby regulate the flow of fluid.

9. Apparatus for controlling the flow of a fluid, comprising in combination, means for ascertaining periodically the variation in rate of such flow from a given rate of flow, means for effecting similarly periodic regulation of such flow in accordance with the variations so ascertained and means for varying the duration of such periods for different rates of flow of the fluid to thereby minimize hunting effects.

10. Apparatus for controlling the rate of flow of a fluid, comprising in combination, means for subjecting such flow to regulative action involving a time element which varies for different rates of such flow, means for ascertaining the variation of such rate of flow from a given rate at intervals the duration of which varies similarly for different rates of flow and means for subjecting such regulative action to control in accordance with the variations so ascertained.

11. Apparatus for controlling the rate of flow of a fluid, comprising in combination, means for effecting a heat exchange involving elements one of which comprises such flowing fluid, means for ascertaining the variation between the resulting temperature change of one of said elements and the temperature change of the same element resulting from a similar heat exchange involving such fluid flowing at a given rate, means for subjecting such flow of fluid at timed intervals to regulative action in accordance with the variations so ascertained and involving a time element which varies for different rates of such flow and means for similarly varying the duration of such intervals for different rates of flow of the fluid to thereby minimize over-regulation and hunting effects.

In witness whereof, I have hereunto subscribed my name.

JOHN C. WILSON.